United States Patent
Hu (10) Patent No.: US 10,661,718 B2
(45) Date of Patent: May 26, 2020

(54) VEHICLE SEATBACK ASSEMBLY

(71) Applicant: Nissan North America, Inc., Franklin, TN (US)

(72) Inventor: Teng Hu, San Diego, CA (US)

(73) Assignee: Nissan North America, Inc., Franklin, TN (US)

( * ) Notice: Subject to any disclaimer, the term of this patent is extended or adjusted under 35 U.S.C. 154(b) by 112 days.

(21) Appl. No.: 15/656,824

(22) Filed: Jul. 21, 2017

(65) Prior Publication Data

US 2019/0023186 A1 Jan. 24, 2019

(51) Int. Cl.
*B60R 7/04* (2006.01)
*B60N 2/64* (2006.01)
*B60R 11/02* (2006.01)
*B60R 11/00* (2006.01)

(52) U.S. Cl.
CPC ............. *B60R 7/043* (2013.01); *B60N 2/64* (2013.01); *B60R 11/0229* (2013.01); *B60R 2011/0015* (2013.01); *B60R 2011/0276* (2013.01)

(58) Field of Classification Search
CPC ........ B60R 7/043; B60R 11/0229; B60N 2/64
USPC ........................................ 297/188.04, 188.07
See application file for complete search history.

(56) References Cited

U.S. PATENT DOCUMENTS

| | | | |
|---|---|---|---|
| 3,294,134 A | 12/1966 | Matross et al. | |
| 3,596,987 A * | 8/1971 | Wilson | B60N 3/004 297/188.07 X |
| 3,615,118 A * | 10/1971 | Buxton | B60N 3/004 297/188.07 |
| 3,669,276 A | 6/1972 | Woods | |
| 5,695,240 A * | 12/1997 | Luria | B60N 3/004 297/163 |
| 6,450,571 B1 | 9/2002 | Canni et al. | |
| 7,891,733 B1 * | 2/2011 | Clarke | A47C 7/62 211/118 |
| 2014/0042781 A1 * | 2/2014 | Reeves | B60N 3/004 297/188.07 X |
| 2015/0298614 A1 * | 10/2015 | Pywell | B60R 7/043 297/188.07 |
| 2015/0298615 A1 * | 10/2015 | Pywell | B60R 7/043 297/188.04 X |

* cited by examiner

*Primary Examiner* — Anthony D Barfield
(74) *Attorney, Agent, or Firm* — Global IP Counselors, LLP (57) ABSTRACT

A vehicle seatback assembly includes a cavity disposed in a seatback of a vehicle and a storage system. The storage system is movable between a first position in which the storage system is stowed in the cavity and a second position in which the storage system extends from the cavity.

17 Claims, 7 Drawing Sheets

VEHICLE SEATBACK ASSEMBLY

BACKGROUND

Field of the Invention

The present invention generally relates to a vehicle seatback assembly. More specifically, the present invention relates to a vehicle seatback assembly in which a storage system is movable between a first position in which the storage system is stowed in a cavity disposed in a seatback of a vehicle and a second position in which the storage system extends from the cavity.

Background Information

Many accessories exist for providing organization and storage in a vehicle. However, currently existing storage systems generally include at least one strap secured to either a headrest or a seatback of a front passenger seat of a vehicle. These conventional storage systems can add discomfort to a passenger using the front passenger seat, particularly in view of the straps and/or buckles that wrap around the headrest or the seatback of the front passenger seat. Additionally, these conventional storage systems are aesthetically unappealing as the storage systems remain in view when not in use. Further, these conventional storage systems can make entering and exiting a vehicle cabin of the vehicle more difficult for a passenger in accessing or exiting from a rear passenger seat as the storage systems remain in place when not in use. Accordingly, a need exists for a vehicle seatback assembly that is aesthetically more appealing while more efficiently utilizing space in a passenger cabin of a vehicle.

SUMMARY

In view of the state of the known technology, one aspect of the present invention includes a vehicle seatback assembly including a seatback, a cavity disposed in the seatback, and a storage system. The storage system is movable between a first position in which the storage system is stowed in the cavity and a second position in which the storage system extends from the cavity.

Another aspect of the present invention includes a vehicle seatback assembly including a seatback, a cavity disposed in the seatback and a plurality of connected storage bins. The plurality of connected storage bins are movable between a first position in which the plurality of storage bins are collapsed and stored in the cavity and a second position in which the plurality of storage bins are expanded and disposed externally of the cavity.

Also other objects, features, aspects and advantages of the disclosed vehicle seatback assembly will become apparent to those skilled in the art from the following detailed description, which, taken in conjunction with the annexed drawings, discloses exemplary embodiments of the vehicle seatback assembly.

BRIEF DESCRIPTION OF THE DRAWINGS

Referring now to the attached drawings which form a part of this original disclosure.

DETAILED DESCRIPTION OF EXEMPLARY EMBODIMENTS

Selected exemplary embodiments will now be explained with reference to the drawing figures. It will be apparent to those skilled in the art from this disclosure that the following descriptions of the exemplary embodiments are provided for illustration only and not for the purpose of limiting the invention as defined by the appended claims and their equivalents.

Referring initially to FIGS. 1-5, a vehicle seatback assembly 10 is illustrated in accordance with an exemplary embodiment of the present invention. A typical vehicle seat 12 includes a base 14, a lower seat portion 16, a seatback 18 and a headrest 20. The base 16 is preferably fixed to a floor of a vehicle within a passenger compartment. The base 14, the lower seat portion 16, the seatback 18 and the headrest 20 are connected to one another in a conventional manner. The vehicle can be any vehicle in which the typical vehicle seat can be disposed, such that the vehicle, the vehicle floor and the passenger compartment are not discussed or illustrated herein. Additionally, conventional parts of the vehicle seat are not discussed or illustrated in detail herein.

As shown in FIGS. 1-5, the vehicle seatback 18 is disposed adjacent to the lower seat portion 16 and has a passenger back supporting surface 22 and a non-passenger supporting, or a rear, surface 24. The passenger back supporting surface 22 and the non-passenger supporting surface 24 face in opposite directions, i.e., forward and rearward, respectively.

Figure 2:
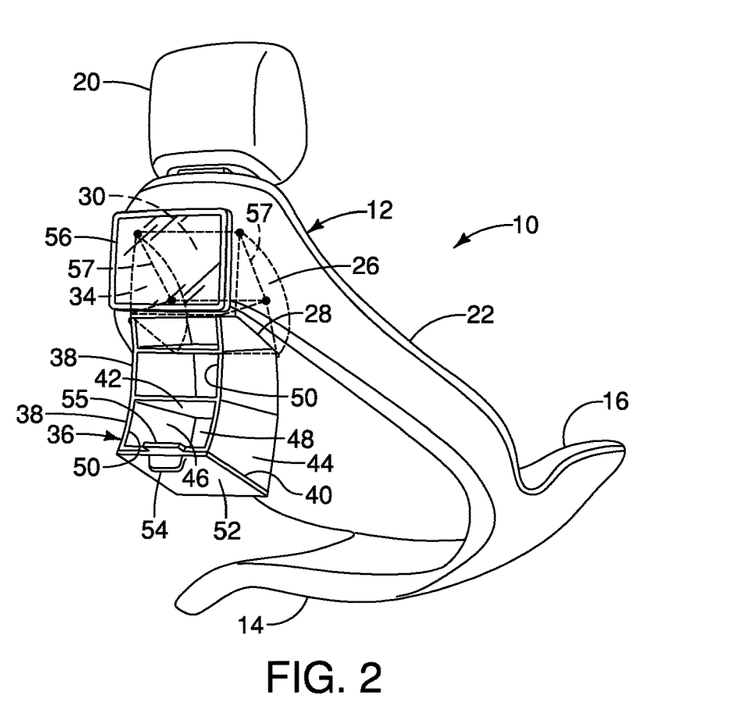
FIG. 2 is a perspective view of the vehicle seatback assembly of FIG. 1 in which the storage system is in a second position.
Figure 5:
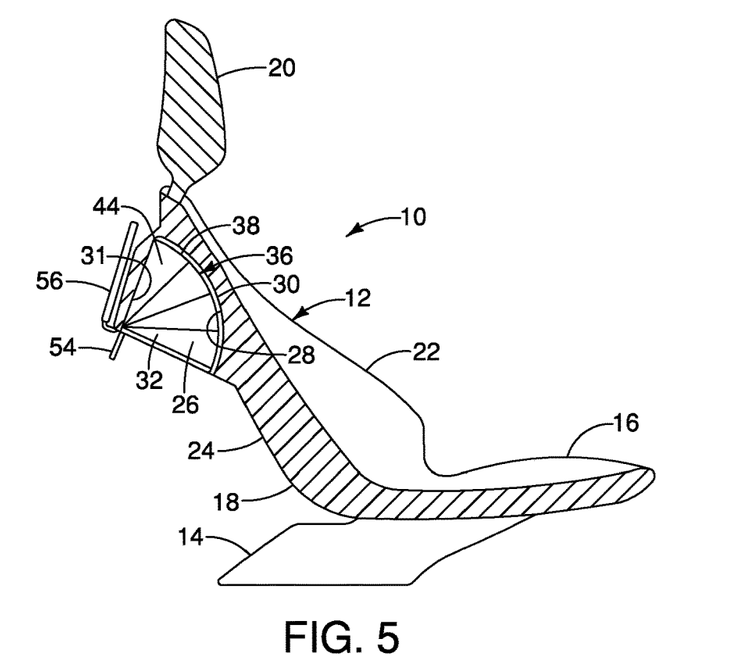
FIG. 5 is a side elevational view in cross section of the vehicle seatback assembly of FIG. 3.

A cavity 26 is disposed in the vehicle seatback 18, as shown in FIGS. 2 and 5. The cavity 26 is accessible through an opening 28 in the rear surface 24 of the seatback 18. The cavity 26 is defined by a forward wall 30, a rear wall 31 and oppositely disposed side walls 32 and 34. The cavity 26 can have any suitable shape configured to receive a storage system 36.

Figure 4:
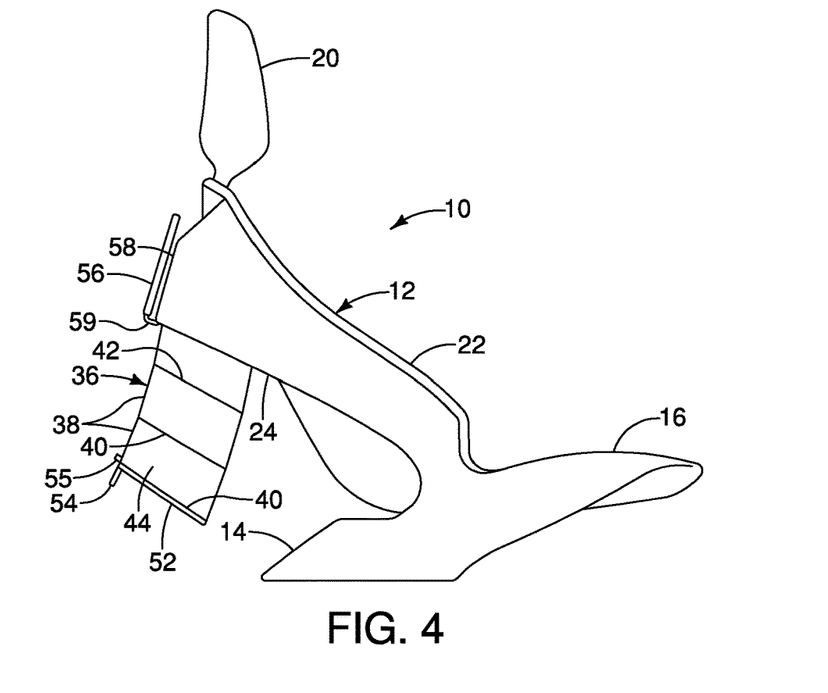
FIG. 4 is a side elevational view of the vehicle seatback assembly of FIG. 2.

The storage system 36 includes at least one storage bin 38, as shown in FIGS. 2 and 4. Preferably, the storage system 36 includes a plurality of connected storage bins 38. Although three storage bins are shown in FIGS. 2 and 4, the storage system 36 can include any suitable number of storage bins.

Figure 1:
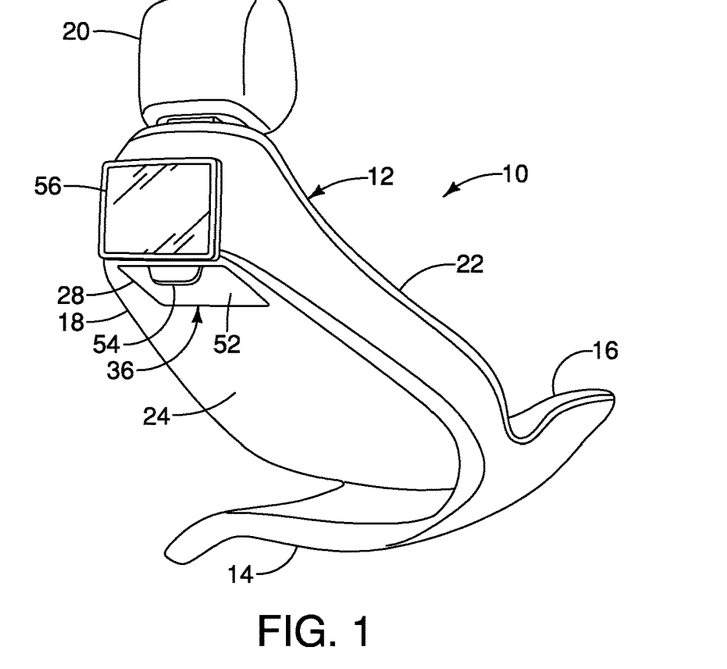
FIG. 1 is a perspective view of a vehicle seatback assembly in accordance with a first exemplary embodiment of the present invention in which a storage system is in a first position.
Figure 3:
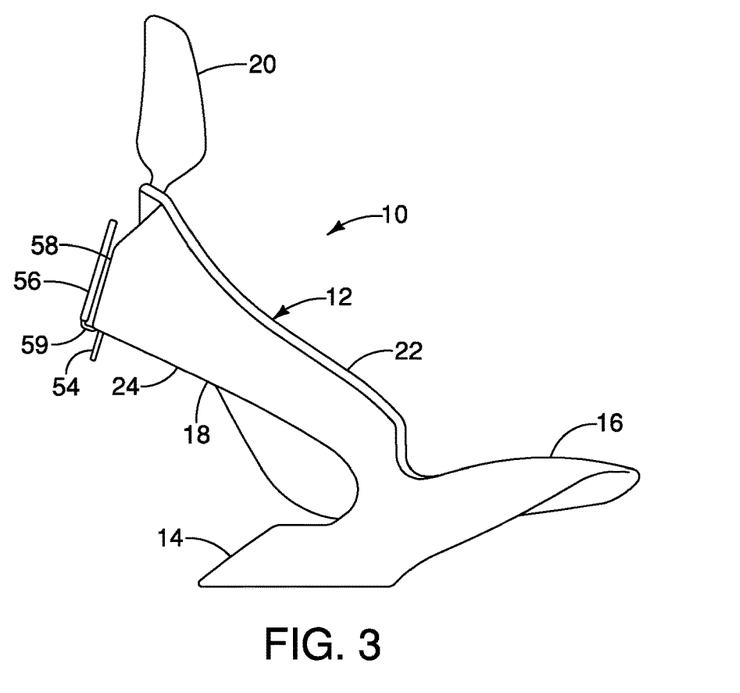
FIG. 3 is a side elevational view of the vehicle seatback assembly of FIG. 1.

The storage system 36 is movable between a first, or stowed, position, as shown in FIGS. 1, 3 and 5, and a second, or in-use, position, as shown in FIGS. 2 and 4. In the first position, the storage system 36 is stowed in the cavity 26 to be inaccessible and not visible to passengers in the cabin compartment of the vehicle. In the second position, the storage system 36 is extended from the cavity 26 through the opening 28 in the rear surface 24 of the seatback 18 to be accessible to a passenger in the cabin compartment of the vehicle.

Each storage bin 38 includes a plurality of wall panels, as shown in FIG. 2. The storage bin 38 includes a lower wall panel 40 and an opposing upper wall panel 42. Opposing side wall panels 44 and 46 extend between the lower and upper wall panels 40 and 42. A rear wall panel 48 connects rear edges of the lower wall panel 40, the upper wall panel 42 and the side wall panels 44 and 46 to close a rear end of the storage bin 38. A storage bin opening 50 is defined by front edges of the lower wall panel 40, the upper wall panel 42 and the side wall panels 44 and 46, thereby providing access to the storage bin 38. As shown in FIGS. 2 and 4, the lower wall panel 40 slants downwardly in a forward direction of the vehicle, i.e., the lower wall panel 40 slants downwardly from the storage bin opening 50 toward the rear wall panel 48. The downwardly slanting lower wall panel 40 facilitates retaining items in the storage bin 38, thereby substantially preventing items stored in the storage bin 38 from accidentally falling out.

The lower wall panel 40, the upper wall panel 42, the side wall panels 44 and 46 and the rear wall panel 48 are made of any suitable material that allows the plurality of storage bins 38 of the storage system 36 to collapse upon themselves in an accordion-like manner, as shown in FIG. 5. Preferably, the side wall panels 44 and 46 and the rear wall panel 48 of the storage bins 38 are made of a durable material, such as cloth. By collapsing in an accordion-like fashion, the plurality of storage bins 38 can easily be moved from the second position through the opening 28 in the rear surface 24 to the first position to stow the storage system 36 in the cavity 26.

The lowermost lower wall panel 40 can have a rigid cover 52 fixed thereto. The rigid cover 52 is shaped to correspond to the shape of the opening 28, thereby providing an aesthetically pleasing appearance when the storage system 36 is stowed in the cavity 26 in the first position. The rigid cover 52 is received by the seatback 18 when the storage system 36 is in the first position. Preferably, the rigid cover 52 is substantially flush with the rear surface 24 of the seatback 18 when the storage system 36 is in the first position. The rigid cover 52 can be fixed to the lowermost wall panel 40 in any suitable manner. The rigid cover 52 can be made of any suitable material, such as cardboard. Alternatively, the lowermost lower wall panel 40 can be the rigid cover.

A tab 54 is connected to the lowermost storage bin 38 of the storage system 36 to facilitate moving the storage system from the first position to the second position. As shown in FIGS. 1 and 2, the tab 54 extends downwardly from the front edge of the lowermost storage bin 38 to facilitate being easily grasped by a vehicle passenger. The tab 54 preferably extends from a front edge of the lowermost lower wall panel 40. A latching member 55 can extend forwardly from a front edge of the lowermost lower wall panel 40, as shown in FIGS. 2 and 4, to engages a corresponding latch disposed in the cavity 26 to facilitate securely retain the storage system 36 in the first position. Applying sufficient downward force on the tab 54 causes the cavity latch to flex such that the latching member 55 disengages the cavity latch such that the storage system 36 can be pulled down to the second position such that the plurality of storage bins 38 extend from the cavity 26.

An uppermost upper wall panel 42 is preferably pivotally connected to the rear wall 31 of the cavity 26, as shown in FIG. 2. A pair of connecting members 57 extend from the rear wall 31 of the cavity 26 to the uppermost wall panel 42. When the storage system 36 is moved from the first position to the second position, the pivotal connection allows the storage system to expand and the pair of connecting members 57 limit the downward pivotal movement of the storage system 36. When the storage system 36 is collapsed upon moving from the second position to the first position, the pivotal connection facilitates collapsing the storage system into the cavity 26. Any suitable pivotal connection can be used, such as a hinge. Any suitable connecting member 57 can be used, such as a string or a cord.

A display 56 can be mounted on the rear surface 24 of the seatback 18, as shown in FIGS. 1-5. The display 56 can be used to control operation of the storage system 36. The latch can be electronically controlled, such that by selecting an open storage system command with the display 56 controls the cavity latch to disengage the storage system 36 such that the storage system moves to the second position.

A vertically extending pocket 58 is defined between the display 56 and the seatback 18 to provide additional storage, as shown in FIGS. 3-5. The display 56 is preferably spaced rearwardly from the rear surface of the seatback to form the pocket 58. A mounting member 59 can be used to secure the display 56 to the rear surface 24 of the seatback 18 in any suitable manner, thereby defining a bottom of the pocket 58 to prevent items from falling through the pocket 58.

Figure 6:
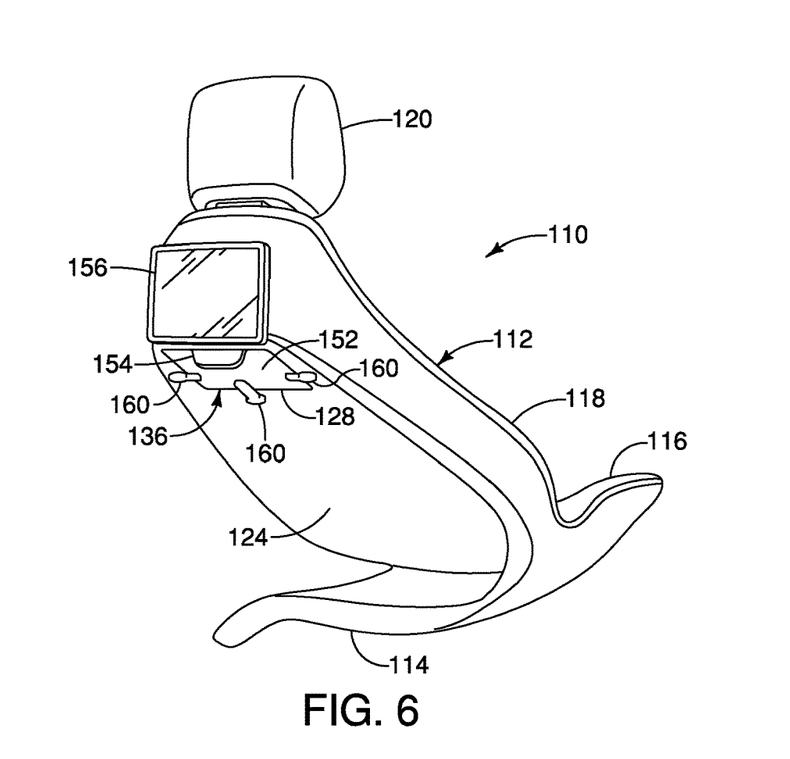
FIG. 6 is a perspective view of a vehicle seatback assembly in accordance with a second exemplary embodiment of the present invention in which a locking member locks a storage system in a first position.

As shown in FIG. 6, a vehicle seatback assembly 110 in accordance with a second exemplary embodiment of the present invention is substantially similar to the vehicle seatback assembly 10 of the first exemplary embodiment except for the differences described below. Similar parts are identified with similar reference numerals, except increased by 100 (i.e., 1xx, accordingly).

At least one locking member 160, as shown in FIG. 6, is pivotally connected to the rear surface 124 of the seatback 118. The locking member 160 locks the storage system 136 in the cavity in the first position. The locking member 160 overlies the opening 128 to prevent the storage system 136 from moving to the second position. The locking member 160 contacts the rigid cover 152 and prevents movement of the rigid cover 152 in the downward direction. Pivoting the locking member 160 to a position that does not overlie the opening 128 allows the storage system 136 to be moved to the second position. The locking member 160 can be in addition to or in lieu of the latching member and latch engagement described above. FIG. 6 illustrates three locking member 160, although any suitable number of locking members can be used. Alternatively, the locking member 160 can engage the lowermost lower panel to retain the storage system 136 in the closed position when a rigid cover is not used.

Figure 7:
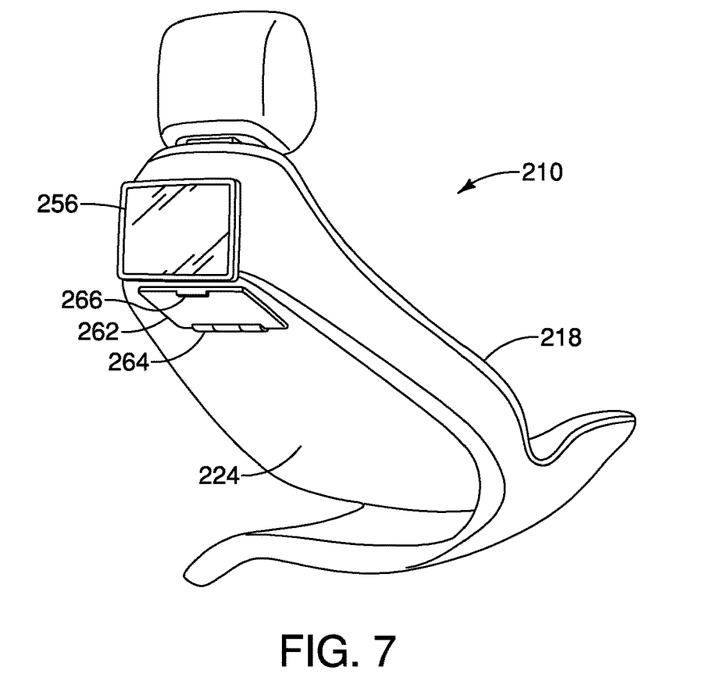
FIG. 7 is a perspective view of a vehicle seatback assembly in accordance with a third exemplary embodiment of the present invention in which a door locks a storage system in a first position.
Figure 8:
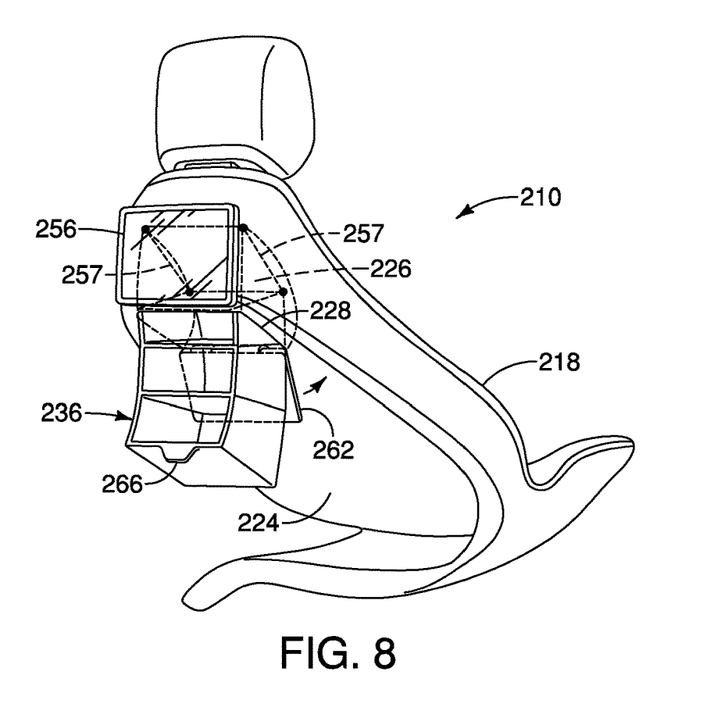
FIG. 8 is a perspective view of the vehicle seatback assembly of FIG. 7 in which the storage system is in a second position.

As shown in FIGS. 7 and 8, a vehicle seatback assembly 210 in accordance with a third exemplary embodiment of the present invention is substantially similar to the vehicle seatback assembly 10 of the first exemplary embodiment except for the differences described below. Similar parts are identified with similar reference numerals, except increased by 200 (i.e., 2xx, accordingly).

A door 262 is pivotally mounted to the rear surface 224 of the seatback 218, as shown in FIGS. 7 and 8. The door 262 can be pivotally mounted to the seatback 218 in any suitable manner, such as with a hinge 264. The door 262 can have a handle 266 to facilitate moving the door 262 by a vehicle passenger. With the door 262 in the closed position shown in FIG. 7, the storage system 236 is maintained in the first, or stowed, position in the cavity 226. The door 262 is pivoted to an open position, as shown in FIG. 8, such that the storage system 236 can be extended to the second position. The door 262 can be secured in the closed position in any suitable manner. The display 256 can be used to control the opening of the door 262.

The storage system 236 can be configured to move to the second position, as shown in FIG. 8, upon the door 262 being opened. Alternatively, the storage system 262 can have a latching member that engages a cavity latch as described with respect to the first exemplary embodiment, such that the tab 266 can be grasped by a vehicle passenger to move the storage system 236 to the second position after the door 262 is opened.

Figure 9:
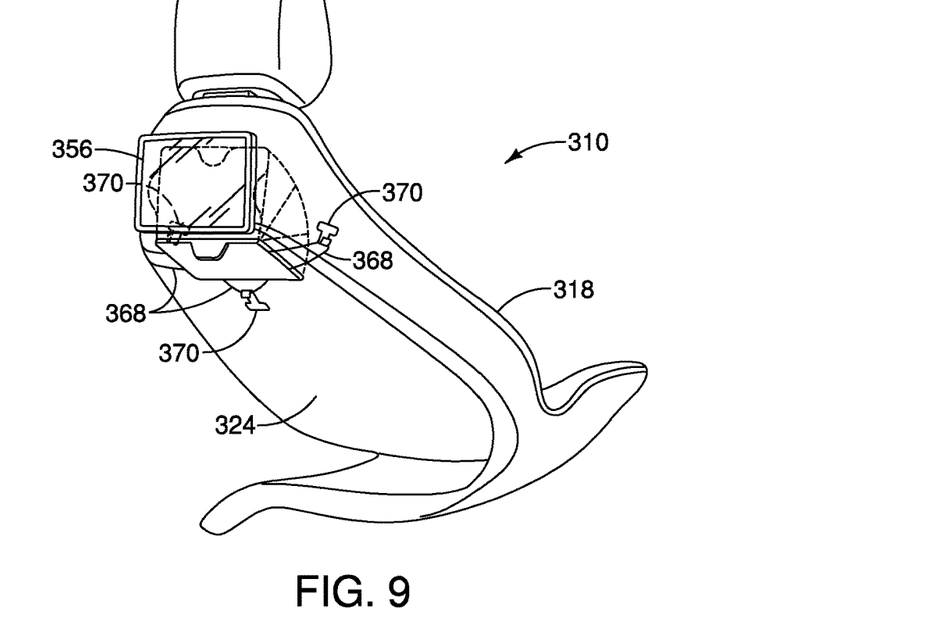
FIG. 9 is a perspective view of a vehicle seatback assembly in accordance with a fourth exemplary embodiment of the present invention in which a plurality of flexible cords lock a storage system in a first position.
Figure 10:
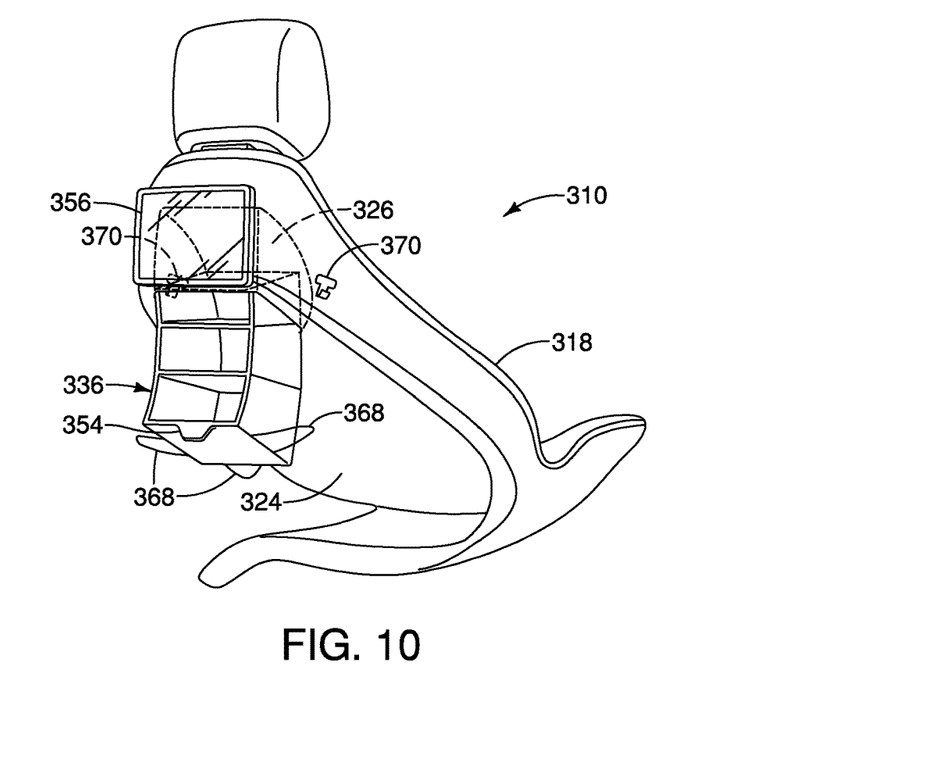
FIG. 10 is a perspective view of the vehicle seatback assembly of FIG. 9 in which the storage system is in a second position.

As shown in FIGS. 9 and 10, a vehicle seatback assembly 310 in accordance with a fourth exemplary embodiment of the present invention is substantially similar to the vehicle seatback assembly 10 of the first exemplary embodiment except for the differences described below. Similar parts are identified with similar reference numerals, except increased by 300 (i.e., 3xx, accordingly).

A plurality of flexible cords 368 extend between the storage system 336 and a plurality of attachment points 370, as shown in FIGS. 9 and 10. Each flexible cord 368 is secured at a first end to a lowermost lower panel or a rigid cover of the storage system 336. A second end of the flexible cord 368 is removably connected to the attachment point 370. The attachment point 370 can be any suitable structure, such as a hook shown in FIGS. 9 and 10.

Each flexible cord 368 is secured to its respective attachment point 370 to maintain the storage system 336 in the first position within the cavity 326, as shown in FIG. 9. Each flexible cord 368 is disengaged from its respective attachment point 370 to allow the storage system 336 to extend to the second position, as shown in FIG. 10. A vehicle passenger can move the storage system back to the first position within the cavity 326 and reattach each flexible cord 368 to its respective attachment point 370 to stow the storage system 336. The tab 354 can be grasped by the vehicle passenger to facilitate moving the storage system 336.

Figure 11:
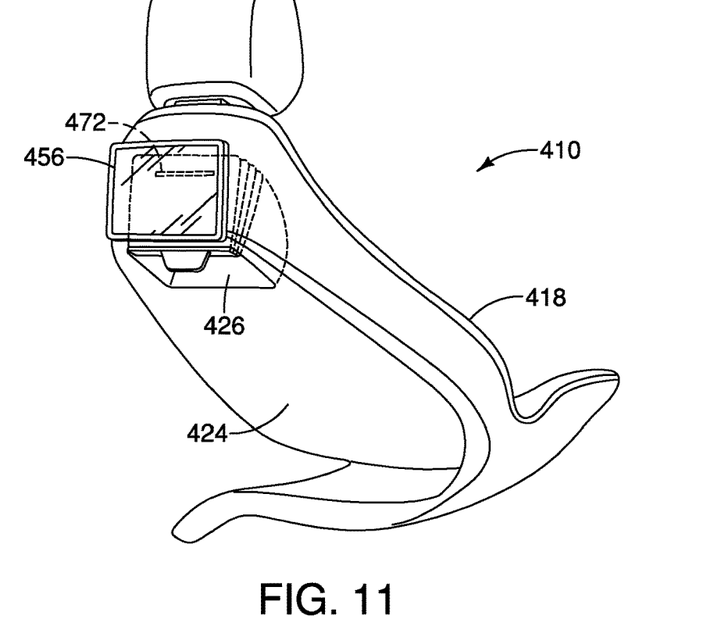
FIG. 11 is a perspective view of a vehicle seatback assembly in accordance with a fifth exemplary embodiment of the present invention in which a magnetic member secures a storage system in a first position.
Figure 12:
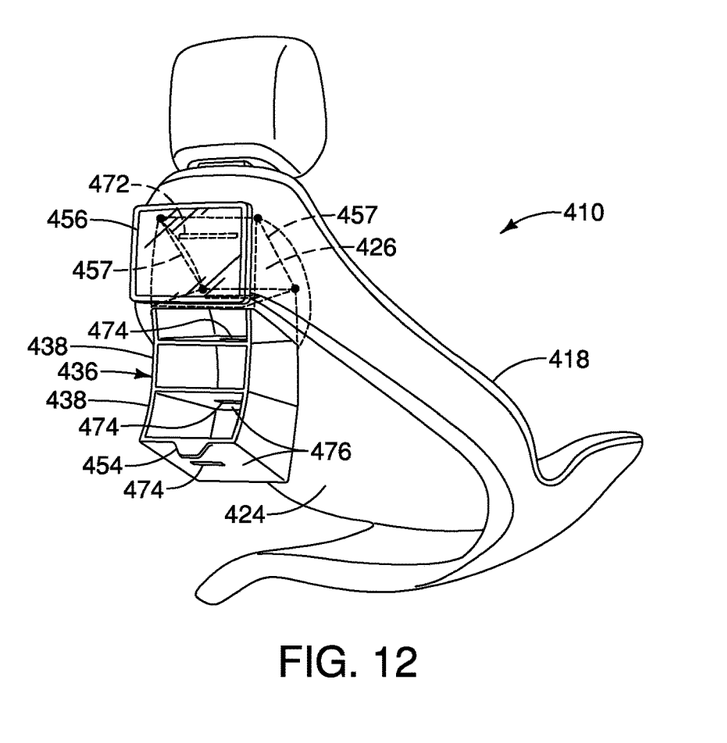
FIG. 12 is a perspective view of the vehicle seatback assembly of FIG. 11 in which the storage system is in a second position.

As shown in FIGS. 11 and 12, a vehicle seatback assembly 410 in accordance with a fifth exemplary embodiment of the present invention is substantially similar to the vehicle seatback assembly 10 of the first exemplary embodiment except for the differences described below. Similar parts are identified with similar reference numerals, except increased by 400 (i.e., 4xx, accordingly).

A first magnet 472 is disposed in the cavity 426. A plurality of second magnets 474 are disposed in the storage system 436. Preferably, as shown in FIG. 12, a second magnet 474 is disposed in each of the horizontal wall panels 476. Alternatively, one second magnet 474 is disposed on the lowermost horizontal panel 476 to magnetically engage the first magnet 472 in the first position. The storage system 436 is retained in the first position by the magnetic force between the first magnet 472 and the plurality of second magnets 474. The plurality of second magnets 474 are disposed in the horizontal wall panels 476 such that the second magnets 474 are aligned with the first magnet 472 when the storage system is in the closed position shown in FIG. 11. Applying sufficient force to the tab 454 of the storage system overcomes the magnetic force such that the storage system 436 can be extended to the second position as shown in FIG. 12. The storage system 436 can be moved back into the cavity 426 to reengage the plurality of second magnets 474 with the first magnet 472 to retain the storage system 436 in the first position such that the storage bins 438 are in the collapsed position.

A pair of connecting members 457 extend from the rear wall of the cavity 426 to the uppermost horizontal wall panel 476. When the storage system 436 is moved from the first position to the second position, the pivotal connection between the lowermost horizontal wall panel 476 and the rear wall of the cavity 426 allows the storage system to expand and the pair of connecting members 457 limit the downward pivotal movement of the storage system 436. When the storage system 436 is collapsed upon moving from the second position to the first position, the pivotal connection facilitates collapsing the storage system into the cavity 426. The plurality of second magnets 474 are magnetically attracted to the first magnet 472 to retain the storage system 436 in the first position. Any suitable pivotal connection can be used, such as a hinge. Any suitable connecting member 457 can be used, such as a string or a cord.

Figure 13:
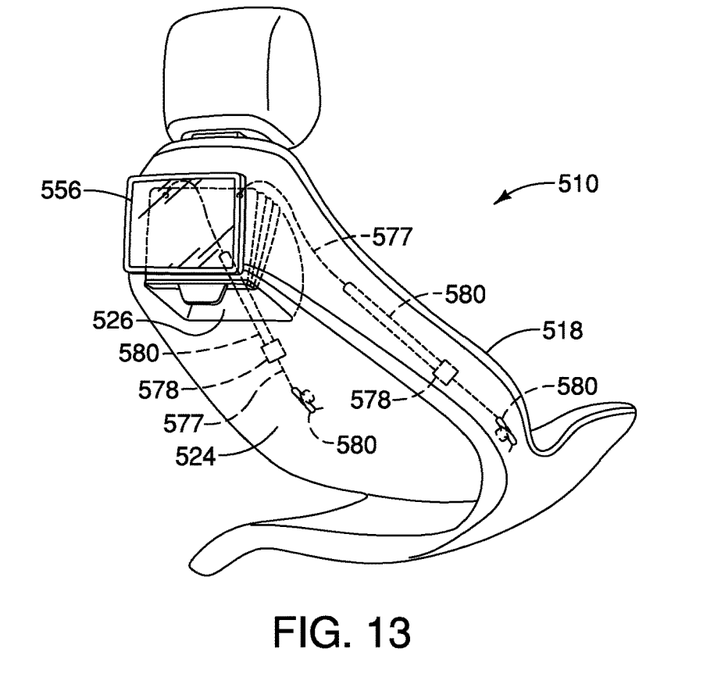
FIG. 13 is a perspective view of a vehicle seatback assembly in accordance with a sixth exemplary embodiment of the present invention in which a cord system secures a storage system in a first position.
Figure 14:
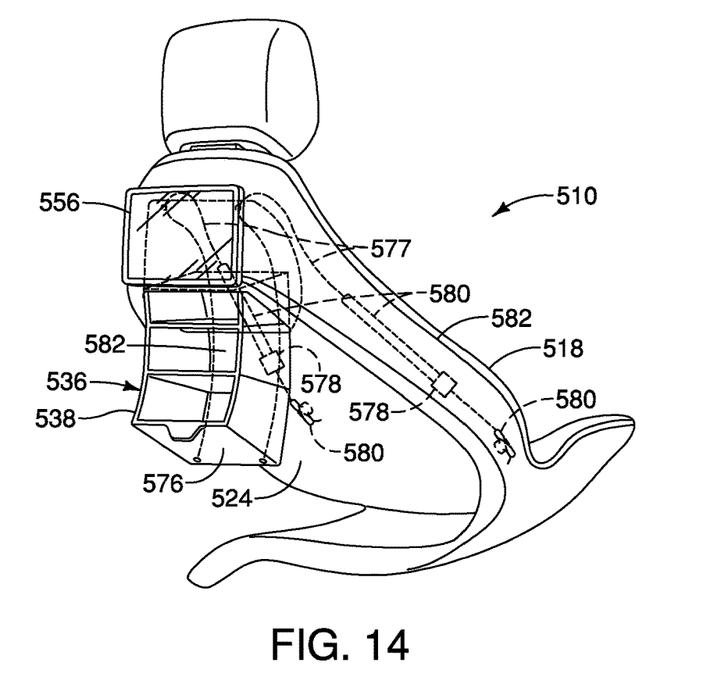
FIG. 14 is a perspective view of the vehicle seatback assembly of FIG. 13 in which the storage system is in a second position.

As shown in FIGS. 13 and 14, a vehicle seatback assembly 510 in accordance with a sixth exemplary embodiment of the present invention is substantially similar to the vehicle seatback assembly 10 of the first exemplary embodiment except for the differences described below. Similar parts are identified with similar reference numerals, except increased by 500 (i.e., 5xx, accordingly).

A cord 577 extends through the storage system 536 such that manipulation of the cord 577 moves the storage system 536 between the first and second positions, as shown in FIGS. 13 and 14. As shown in FIGS. 13 and 14, a right and a left cord 577 are used to move the storage system 536, although any suitable number of cords can be used.

Each cord 577 has a motorized spool 578 around which the cord 577 is wound. The motorized spool 578 is disposed in the seatback 518. A sleeve 580 can be disposed in the seatback 518 to facilitate guiding movement of the cord 577 between the motorized spool 578 and the storage system 536. A first end of the cord 577 is connected to an anchor 580, such as a cleat. The anchor 580 can be disposed in any suitable location. Alternatively, a first end of the cord 577 can be connected to the motorized spool 578. A second end of the cord 577 is connected to the lowermost horizontal panel 576 of the lowermost storage bin 538.

The motorized spool 578 can be electrically connected to the display 556 by electrical wires 582 such that operation of the motorized spool 578 can be controlled by a vehicle passenger through the display 556. The motorized spool 578 is rotated in a first direction to unwind the cord 577, thereby extending the storage system 536 to the second position, as shown in FIG. 14. The sleeve 580 guides movement of the cord 577 in the unwinding direction.

The display 578 can be used to control the motorized spool 578 to wind the cord 577, thereby moving the storage system 536 to the first position. The motorized spool 578 is rotated in a second direction, which is opposite to the first direction, to wind the cord 577 on the motorized spool 578, thereby drawing the plurality of storage bins 5538 upwardly and collapsing the plurality of storage bins 538 in the cavity 526, as shown in FIG. 13.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above exemplary embodiment, the following directional terms "forward", "rearward", "above", "downward", "vertical", "horizontal", "below" and "transverse" as well as any other similar directional terms refer to those directions of a vehicle.

The terms of degree such as "substantially", "generally", "about" and "approximately" as used herein mean a reasonable amount of deviation of the modified term such that the end result is not significantly changed.

While only selected exemplary embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another exemplary embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature. Thus, the foregoing descriptions of the exemplary embodiments according to the present invention are provided for illustration only, and not for the purpose of limiting the invention as defined by the appended claims and their equivalents.

What is claimed is:

1. A vehicle seatback assembly, comprising:
    a seatback;
    a cavity enclosed by the seatback; and
    a storage system connected to the seatback and movable between a first position in which the storage system is stowed in the cavity and a second position in which the storage system extends from the cavity, the storage system being collapsed in the first position and expanded in the second position,
    the storage system includes a plurality of connected storage bins, a lowermost bin having a rigid cover received by the seatback when the storage system is in the first position to cover the cavity.

2. The vehicle seatback assembly according to claim 1, wherein
    a locking member is pivotally connected to the seatback to lock the storage system in the cavity in the first position.

3. The vehicle seatback assembly according to claim 1, wherein
    a bottom wall panel of each storage bin is angled upwardly to prevent contents stored therein from accidentally falling out.

4. The vehicle seatback assembly according to claim 1, wherein
    a door is pivotally connected to the seatback to pivot between a closed position to maintain the storage system in the first position and an open position to allow removal of the storage system.

5. The vehicle seatback assembly according to claim 1, wherein
    a first magnet is disposed in the cavity and a second magnet is disposed on the storage system to maintain the storage system in the first position.

6. The vehicle seatback assembly according to claim 5, wherein
    a plurality of second magnets are disposed in each of the storage bins to maintain each of the storage bins in a collapsed position when the storage system is in the first position.

7. The vehicle seatback assembly according to claim 6, wherein
    a tab is connected to the lowermost storage bin to facilitate moving the storage system from the first position to the second position.

8. The vehicle seatback assembly according to claim 1, wherein
    a cord extends through each of the plurality of storage bins such that movement of the cord moves the storage system between the first and second positions.

9. The vehicle seatback assembly according to claim 8, wherein
    a motorized spool controls movement of the cord.

10. The vehicle seatback assembly according to claim 1, wherein
    the storage system includes a plurality of flexible cords, each of the flexible cords being attached to a separate attachment point to facilitate retaining the storage system in the first position.

11. A vehicle seatback assembly, comprising:
    a seatback;
    a cavity enclosed by the seatback;
    a storage system connected to the seatback and movable between a first position in which the storage system is stowed in the cavity and a second position in which the storage system extends from the cavity, the storage system being collapsed in the first position and expanded in the second position; and
    a display mounted on the seatback to control operation of the storage system.

12. The vehicle seatback assembly according to claim 11, wherein
    a pocket is defined between the display and the seatback to provide additional storage.

13. A vehicle seatback assembly, comprising:
a seatback;
a cavity enclosed by the seatback;
a plurality of connected storage bins connected to the seatback and movable between a first position in which the plurality of storage bins are collapsed and stored in the cavity and a second position in which the plurality of storage bins are expanded and disposed externally of the cavity; and
a cord extending through each of the plurality of storage bins such that movement of the cord moves the plurality of storage bins between the first and second positions.

14. The vehicle seatback assembly according to claim 13, wherein
a lowermost bin of the plurality of storage bins has a rigid cover disposed substantially flush with an outer surface of the seatback when the plurality of storage bins are disposed in the first position.

15. The vehicle seatback assembly according to claim 14, wherein
a locking member is pivotally connected to the seatback to lock the plurality of storage bins in the cavity in the first position.

16. The vehicle seatback assembly according to claim 13, wherein
a display is mounted on the seatback to control operation of the storage system, and
a pocket is defined between the display and the seatback to provide additional storage.

17. The vehicle seatback assembly according to claim 13, wherein
a first magnet is disposed in the cavity and a second magnet is disposed on one of the plurality of storage bins to maintain the plurality of storage bins in the first position.

* * * * *